United States Patent
Heckmann

(10) Patent No.: US 7,154,227 B2
(45) Date of Patent: Dec. 26, 2006

(54) CIRCUIT ARRANGEMENT FOR OPERATING AT LEAST ONE LIGHT SOURCE

(75) Inventor: Markus Heckmann, Munchen (DE)

(73) Assignee: Patent-Treuhand-Gesellschaft Fur Elektrisch Gluhlampen MbH (DE)

( * ) Notice: Subject to any disclaimer, the term of this patent is extended or adjusted under 35 U.S.C. 154(b) by 0 days.

(21) Appl. No.: 11/217,434

(22) Filed: Sep. 2, 2005

(65) Prior Publication Data

US 2006/0061297 A1 Mar. 23, 2006

(30) Foreign Application Priority Data

Sep. 20, 2004 (DE) ............... 10 2004 045 514

(51) Int. Cl.
*G05F 1/00* (2006.01)

(52) U.S. Cl. ............ 315/194; 315/200 R; 315/247; 315/272; 315/291; 363/44; 363/37; 363/81

(58) Field of Classification Search ............... None
See application file for complete search history.

(56) References Cited

U.S. PATENT DOCUMENTS

| | | | |
|---|---|---|---|
| 4,949,013 A | | 8/1990 | Zuchtriegel |
| 5,880,564 A | * | 3/1999 | Franck ............ 315/247 |
| 5,994,847 A | | 11/1999 | Konopka ............ 315/209 |
| 6,316,883 B1 | | 11/2001 | Cho et al. |
| 2003/0071582 A1 | | 4/2003 | Zhang et al. ............ 315/274 |

FOREIGN PATENT DOCUMENTS

| | | |
|---|---|---|
| EP | 0 667 734 A1 | 8/1995 |
| WO | WO 90/09087 | 8/1990 |
| WO | WO 02/47441 A1 | 6/2002 |
| WO | WO 2004/028218 A1 | 4/2004 |

OTHER PUBLICATIONS

"Modified Valley Fill High Power Factor Electronic Ballast for Compact Fluoresent Lamps," Mustansir H. Kheraluwala et al., IEEE Power Electronics Specialists Conference 1995, Jun. 1995, pp. 10-14.
"Improved Crest Factor of Electronic Ballast-Fed Fluorescent Lamp Current Using Pulse Frequency Modulation," Jooho Song et al., IEEE Transactions on Industrial Electronics, vol. 48, No. 5, Oct. 2001, pp. 1015-1023.
Search Report from European Patent Office (for related foreign patent application) referencing the above-listed patent documents, dated Feb. 10, 2006 (8 pages total).

* cited by examiner

*Primary Examiner*—Tuyet Thi Vo
(74) *Attorney, Agent, or Firm*—Fitch, Even, Tabin & Flannery

(57) ABSTRACT

A circuit arrangement for operating at least one light source. Cost-effective power factor correction of the system input is achieved by a combination of a charge pump and a valley-fill circuit. According to the invention, the voltage ($U_{N2}$) produced by the charge pump is fed into the valley-fill circuit with a lag, for example via an inductor (L2).

11 Claims, 1 Drawing Sheet

CIRCUIT ARRANGEMENT FOR OPERATING AT LEAST ONE LIGHT SOURCE

FIELD OF THE INVENTION

The present invention relates to circuit arrangements for the purpose of supplying power to light sources from a power supply system which are suitable for correcting a system-side power factor. The abbreviation PFC will be used below for the expression power factor correction.

A feed system voltage has a system frequency. The term "high-frequency" will be used below for frequencies which are substantially higher than the system frequency.

BACKGROUND OF THE INVENTION

The specification WO 02/47441 (Hu) has disclosed an abovementioned circuit arrangement. This specification has disclosed two PFC techniques: a charge pump (referred to as "single feedback" in the specification WO 02/47441 (Hu)) and a so-called valley-fill circuit (referred to as "double pump" in the specification WO 02/47441 (Hu)). In this case, the charge pump is connected upstream of the valley-fill circuit, when viewed from the system voltage. In addition, the charge pump and the valley-fill circuit are fed by the same high-frequency voltage source.

Charge pumps are known, for example, from the specification U.S. Pat. No. 4,949,013 (Zuchtriegel). A critical feature of a charge pump is the connection of a rectifier output to a pump diode. A high-frequency voltage, which is drawn from a load circuit, is applied to the resultant junction point. It should be emphasized at this point that only one rectifier output is connected to a pump diode, for which reason this part of the circuit arrangement is referred to as "single feedback" in WO 02/47441 (Hu).

Valley-fill circuits are known, for example, from the specification WO 90/09087 (Skalak). Of concern here is a passive PFC circuit comprising two storage capacitors and three diodes, which are connected between two rectifier outputs. The operation of the valley-fill circuit is based on the fact that the storage capacitors are connected via the diodes such that they are charged as a series circuit by a system voltage, but are discharged as a parallel circuit by a load.

A valley-fill circuit may also act as a charge pump by one of its diodes being split into two diodes. For this purpose, a high-frequency AC voltage is to be applied to the junction point of the two diodes produced by splitting. The specification U.S. Pat. No. 6,316,883 (Cho) has disclosed a valley-fill circuit which has been modified in this manner. The operating device described there for discharge lamps also has, in addition, a separate charge pump. This charge pump is connected downstream of the valley-fill circuit, when viewed from the system-voltage side, as a result of which a further storage capacitor is required.

In WO 02/47441 (Hu), the charge pump is connected upstream of the valley-fill circuit. A further storage capacitor is thus not required. The high-frequency AC voltage, which is fed into the charge pump, is derived from the high-frequency AC voltage which is fed to the modified valley-fill circuit.

It can be seen from the specification WO 02/47441 (Hu) that good values can be achieved for the power factor using the circuit arrangement described there. Standards such as IEC 61000-3-2 also prescribe, however, limit values for line current harmonics. In this case, a distinction is drawn between light sources which draw up to 25 W of power from the system voltage and light sources which draw more than 25 W. Above 25 W, the requirements are substantially higher, i.e. the amplitudes of the line current harmonics need to be substantially lower.

One subject matter of the specification WO 02/47441 (Hu) is a compact fluorescent lamp having an integrated operating device. Such lamps are conventional on the market up to a power consumed from the power supply system of 25 W. Since the requirements of relevant standards for the line current harmonics are so low up to 25 W, the circuit arrangement disclosed in WO 02/47441 (Hu) up to 25 W can provide for operation of fluorescent lamps which conforms with the standards.

The requirements for a circuit arrangement for operating light sources are diverse. The following requirements should be taken into account when designing these circuit arrangements:
 high system-side power factor
 low total harmonic distortion (THD) of the current consumed from the power supply system
 line current harmonics which conform to standards
 high degree of efficiency
 low crest factor of the current through the light source
 low radio interference
 low costs
 small geometric dimensions In order to operate fluorescent lamps having a power consumed from the power supply system of up to 25 W, the circuit arrangement disclosed in WO 02/47441 (Hu) represents a good compromise for meeting the abovementioned requirements. Above 25 W, however, it is problematic to adhere to the relevant standards for the line current harmonics. In particular for fluorescent lamps, the crest factor of the lamp current is limited by standards (for example IEC 60929) to a maximum value of 1.7. The adherence to this limit value at a power consumed from the power supply system of above 25 W is an additional problem.

Dimensioning the circuit arrangement disclosed in WO 02/47441 (Hu) to such an extent that the standards as regards line current harmonics are adhered to even in the case of a power consumed from the power supply system of above 25 W leads to components of the circuit arrangement being subjected to a considerably greater load. This leads to an increase in costs, to greater geometric dimensions and to a reduced degree of efficiency.

If, in addition, the limit value for the crest value of the lamp current in accordance with IEC 60929 is intended to be adhered to, the components will be subjected to an even greater load.

A circuit arrangement for operating light sources is known from the as yet unpublished DE 102004001617.8 which has, in addition to the features which are known from WO 02/47441 (Hu), a charge pump which is connected to the negative rectifier output. With such a circuit arrangement, a charge pump is accordingly connected both to the positive and the negative rectifier output. Even at a power consumed from the power supply system of above 25 W, line current harmonics which conform to standards and a lamp current crest factor which conforms to standards are thus achieved with components being subjected to only slight additional loads.

Finally, reference is made to the as yet likewise unpublished DE 102004001618.6 which likewise relates to a development of a circuit arrangement known from WO 02/47441 (Hu) and has the object of making possible a lamp current crest factor which conforms to standards even at a power consumed from the power supply system of above 25 W. This is achieved by a circuit arrangement which, in addition to the features which are known from WO 02/47441 (Hu), has a second resonant capacitor which does not have a pump action. A first resonant capacitor with a pump action and a second resonant capacitor without a pump action provide a degree of freedom with which the properties of the circuit arrangement can be better optimized.

It has been shown that, in the case of certain lamps, in particular HE lamps (HE=high efficiency), sufficiently low lamp current crest factors cannot be achieved despite these measures. Predominantly in the case of low temperatures, there is even the risk of unstable stroboscope-like lamp operation.

SUMMARY OF THE INVENTION

The present invention is therefore based on the object of developing a circuit arrangement for operating at least one light source on the basis of the topology of a circuit arrangement in accordance with WO 02/47441 (Hu) such that the lamp crest factors produced during operation of a lamp can thus be further reduced.

The invention is based on the knowledge that the main cause of a high lamp crest factor is the modulation of the intermediate circuit voltage, as a result of which the lamp load circuit is also extensively modulated. Happily, the envelope of the voltage at the pump coupling-in point, i.e. the second node, shows opposite modulation. The phase angle of this high-frequency oscillation is shifted slightly with respect to the inverter output. In-phase opposition would be optimal in order to be able to use a relatively stable voltage difference for the load circuit in combination with the opposite envelope curves. Owing to a phase-shifting device, which is designed to bring about a lead by more than 90° or a lag of the phase between the coupling point in the reactance network and the second node, the phase angle at the second node can be favorably influenced. This therefore leads to a marked reduction in the lamp crest factor, depending on what degree of complexity is used for producing in-phase opposition which is as great as possible. In addition, in the case of a lamp operated using such a circuit arrangement, marked load relief can be achieved for the lamp inductor depending on the type and design.

In principle, a lag of the phase brought about by the phase-shifting device serves a purpose. However, as is obvious to those skilled in the art, the same effect can be achieved by a lead of more than 90° being implemented by the phase-shifting device.

In one embodiment which can be implemented in a particularly cost-effective manner, the phase-shifting device comprises an inductor; it is implemented in particular by an individual inductor. In a known manner, a phase lag can be achieved by an inductor being connected inbetween, and this phase lag in this case leads to a marked improvement in the lamp crest factor.

The phase-shifting device is preferably connected between the inverter output, as the coupling-out point in the reactance network, and the second node, as the coupling-in point.

The present invention may advantageously also be used with the two inventions mentioned above in accordance with DE 102004001617.8 and DE 102004001618.6, in particular also in combination with the variants proposed therein as preferred embodiments: Provision may therefore be made for the circuit arrangement to have a second pump capacitor and a sixth diode, the second pump capacitor being connected to the second node and the negative rectifier output, and the sixth diode being connected between the negative rectifier output and the negative rail.

Provision may furthermore be made for the reactance network to have a first resonant capacitor, which is connected with its first connection to the positive or the negative rail and is connected with its second connection to the second connection of the lamp inductor, and a second resonant capacitor, which is connected with its first connection to the coupling between the reactance network and the second node and is connected with its second connection to the second connection of the lamp inductor.

It is further preferred for the positive and the negative rail to be connected to one another via a capacitor. Given suitable dimensions, this makes it possible for the positive and the negative rail to be at essentially the same potential with respect to HF.

The phase-shifting device is preferably designed such that the voltage difference between the voltages across the inverter output and across the second node is maximized in the region of minimal system voltage. The reason for this is the fact that the working point of the at least one lamp to be operated is a function of the voltage difference $U_{DIFF}$ between the voltage $U_{OUT}$ provided at the inverter output and the voltage $U_{N2}$ provided at the second node. The lamp current $I_L$ has an envelope curve in which phases having a high amplitude and phases having a low amplitude alternate essentially sinusoidally. During phases in which the lamp $I_L$ has a high amplitude, the voltage $U_{N2}$ across the second node is approximately 0, i.e. the voltage difference $U_{DIFF}=U_{OUT}-U_{N2}$ is essentially equal to $U_{OUT}$, $U_{OUT}$ being the voltage across the invertor output. In phases in which the envelope curve is small, whereas $U_{OUT}$ is low at these points in time, $U_{N2}$ is high and thus the voltage difference $U_{DIFF}$ is strongly dependent on the voltage $U_{N2}$ across the second node. It is now the object to increase the voltage difference $U_{DIFF}$ even in the phases in which the envelope curve of the lamp current IL has a low amplitude. This can be achieved by the phase angle between $U_{OUT}$ and $U_{N2}$ being selected such that it does not result in quenching over temporal ranges which are as long as possible, but $U_{DIFF}$ is maximized. As a result of the fact that $U_{DIFF}$ now fluctuates to a lesser extent, the lamp current crest factor is also reduced.

In one preferred application of the present invention, the light source is a gas discharge lamp having heatable filaments, in each case one connection of a filament being connected to an output terminal of the reactance network and the respective other connection of the filaments being connected via a capacitor when the gas discharge lamp is connected.

Finally, reference is made to the fact that the phase-shifting device may comprise at least one active component, in particular for the purpose of precisely setting the desired phase shift.

Further advantageous embodiments are described in the subclaims.

BRIEF DESCRIPTION OF THE DRAWINGS

One exemplary embodiment of the invention will now be described in more detail below with reference to the attached drawings, in which.

DETAILED DESCRIPTION OF THE INVENTION

In the text which follows, transistors will be denoted by the letter T, diodes by the letter D, capacitors by the letter C, inductors by the letter L, resistors by the letter R and connections by the letter J, in each case followed by a number.

Figure 1:
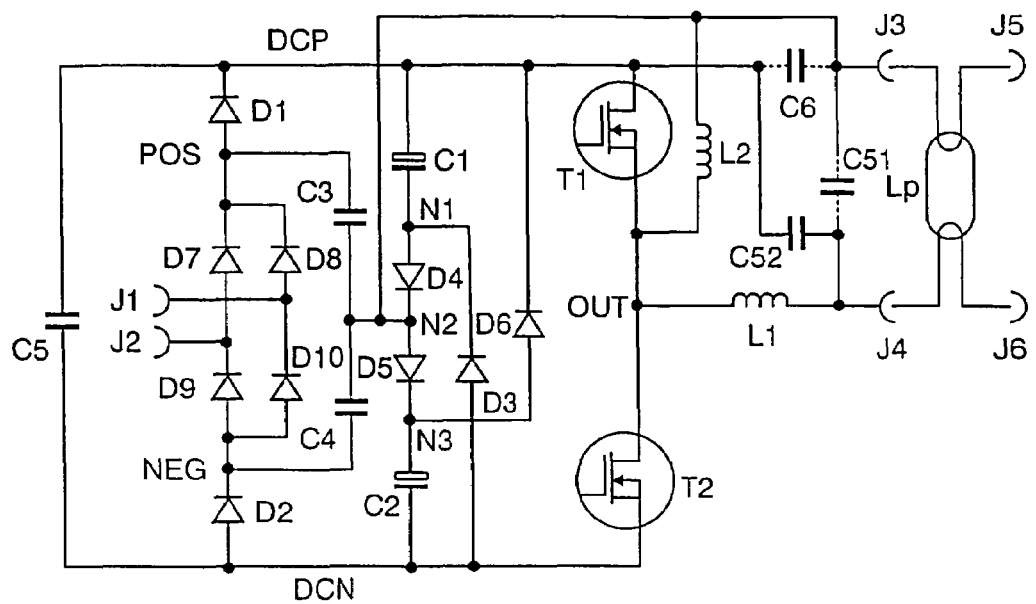
FIG. 1 shows an exemplary embodiment of the invention for a fluorescent lamp having electrode filaments.

FIG. 1 shows an exemplary embodiment of the invention for a fluorescent lamp having electrode filaments. The connections J1 and J2 form the system voltage input. A system voltage can be connected to J1 and J2. J1 and J2 are connected to the input of a rectifier. Means for radio interference suppression may also be connected upstream of the rectifier.

In general, the rectifier comprises a known bridge circuit comprising the rectifier diodes D7, D8, D9 and D10 which make the rectified system voltage available at their positive rectifier output POS and their negative rectifier output NEG. Owing to the charge pump, the rectifier diodes need to be able to be switched at a high frequency. It is also possible for slow rectifier diodes to be used. In this case, however, in each case a quick diode needs to be connected between the bridge circuit and the respective rectifier output.

A diode D1, which is a pump diode, is connected with its anode to the positive rectifier output POS and with its cathode to a positive rail DCP. The positive DCP and the negative rail DCN are connected to one another via the capacitor C5.

An optional diode D2, which is likewise a pump diode, is connected with its cathode to the negative rectifier output NEG and with its anode to the negative rail DCN. This diode D2 may be dispensed with if no second pump capacitor C4 (described later) is provided. The second pump capacitor C4 provides a further improvement as regards the line current harmonics and the lamp current crest factor without subjecting the components to a greater load.

A series circuit comprising four diodes D3, D4, D5 and D6 is connected between the positive DCP and the negative rail DCN, in each case the cathode of these diodes pointing towards the positive rail DCP, and the junction points of these diodes forming the following nodes: a node N1 between the diode D3 and the diode D4, a node N2 between the diode D4 and the diode D5, and a node N3 between the diode D5 and the diode D6.

A first storage capacitor C1 is connected between the positive rail DCP and the node N1. A second storage capacitor C2 is connected between the negative rail DCN and the node N3. The diodes D3, D4, D5 and D6 as well as the storage capacitors C1 and C2 form the valley-fill circuit. Of concern here is a modified valley-fill circuit, as has been mentioned in connection with the abovementioned specification U.S. Pat. No. 6,316,883 (Cho). The diodes D4 and D5 form the abovementioned split diode pair. A high-frequency voltage, which is coupled out of the load circuit, is applied to the node N2 located between the diodes D4 and D5. The action of a charge pump is thereby also achieved in the valley-fill circuit to a limited extent. A resistor may be connected in series with the diodes, as a result of which a further reduction in the line current harmonics can be achieved.

The series circuit comprising two electronic switches T1 and T2 is connected between the positive and the negative rails DCP and DCN. T1 and T2 form a half-bridge inverter which has an inverter output OUT at the junction point between T1 and T2. The half-bridge inverter draws energy via the positive and the negative rails DCP and DCN. By alternately switching T1 and T2 on and off, a high-frequency AC voltage $U_{OUT}$ is applied to the inverter output OUT opposite the negative rail DCN. This output voltage $U_{OUT}$ of the inverter has an inverter oscillating frequency which is substantially higher than the system frequency. The negative rail DCN in this case acts as a reference potential for the purpose of defining the output voltage $U_{OUT}$ of the inverter. The positive rail DCP may also act as the reference potential without restricting universality.

The switches T1 and T2 are in the form of MOSFETs in the exemplary embodiment. However, other electronic switches may also be used. A control voltage, which brings about the alternate switching-on and switching-off of T1 and T2, is applied to the gate terminals of T1 and T2. This control voltage is provided by a control circuit which is not illustrated in FIG. 1. The control circuit may either contain a freely oscillating oscillator or be controlled by the load circuit, as a result of which a self-oscillating half-bridge inverter which is known from the prior art is formed.

A reactance network, whose main task is to match a source impedance of the inverter output OUT to a load impedance of the light source Lp, is connected to the inverter output OUT. In the exemplary embodiment, the reactance network comprises a lamp inductor L1 and a resonant capacitor C52. Optionally, as is indicated by dashed-dotted lines, a further resonant capacitor C51 and a coupling capacitor C6 may be provided. However, these can also be replaced by open circuits. The lamp inductor L1 has a first and a second connection, the first connection being connected to the inverter output OUT. The second connection of the lamp inductor L1 is connected on the one hand to a connection of the resonant capacitor C52 and on the other hand to an output terminal J4. J3 and J4 form output terminals to which a light source Lp can be connected. The connection J3 is connected to the node N2. FIG. 1 shows a fluorescent lamp as an example of a light source. The circuit arrangement may in principle, however, also be used for operating other light sources such as high-pressure discharge lamps, light-emitting diodes or incandescent lamps. In order to operate light-emitting diodes or incandescent lamps, a transformer may be provided which matches the output voltage $U_{OUT}$ of the inverter to the voltage level required by the light sources. The fluorescent lamp illustrated in FIG. 1 has two electrode filaments. Connections of the electrode filaments are connected to the connection terminals J5 and J6. A capacitor (not illustrated) can be provided between said connection terminals J5 and J6. Such a heating capacitor is, however, not required for the principal function of the invention. The present embodiment makes possible so-called cold starting of the lamp. Preheating of the filaments may also be provided by other means which are known from the prior art, such as transformers. The high-frequency AC voltage $U_{N2}$, which is applied to the node N2, is also applied to the pump capacitors C3 and C4. Owing to the connection of the node N2 via the pump capacitor C3 to the positive rectifier output POS, a first charge pump is realized and, owing to the connection of the node N2 via the pump capacitor C4 to the negative rectifier output NEG, a second charge pump is realized. The two pump capacitors C3, C4 preferably have the same value. As has already been mentioned, one of the two pump capacitors can be dispensed with.

According to the invention, the inverter output OUT is connected to the node N2 via a phase-shifting device. In the embodiment illustrated in FIG. 1, the phase-shifting device is implemented by an inductor L2. It is thus possible for a lag of the phase between the inverter output OUT and the node N2 to be brought about. As is obvious to those skilled in the art, a comparable effect can be achieved not only by a lag of the phase but also by a correspondingly extensive lead. In order to set a desired phase shift, different designs of the phase-shifting device are conceivable, particular reference being made also to the implementation using at least one active component.

Only one lamp Lp is depicted in FIG. 1. However, it is also possible for two or more lamps to be operated in a series or parallel circuit. In particular in the case of a series circuit, the invention has an advantageous effect. This can be explained by the fact that, in the case of a series circuit of lamps, the resulting lamp voltage is high in comparison with only one lamp, which leads to high loads on the components without the measures according to the invention.

The high-frequency AC voltage, which is supplied to the node N2, is drawn from the potential at the inverter output OUT in the exemplary embodiment illustrated. The node N2 may, however, also be connected to other potentials which have a high-frequency AC voltage.

Figure 2:
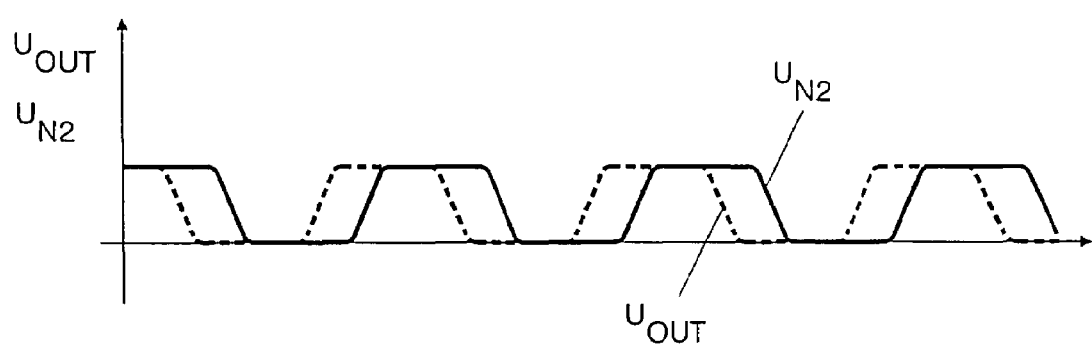
FIG. 2 shows the waveform of the voltage $U_{OUT}$ at the inverter output and the voltage $U_{N2}$ at the second node.

FIG. 2 shows the waveform of the voltage $U_{OUT}$ at the inverter output OUT and the voltage $U_{N2}$ at the node N2. Owing to the phase-shifting device, the waveform of $U_{N2}$ is delayed, i.e. $U_{N2}$ is offset further to the right. As a result, the rms value of the voltage difference $U_{DIFF}=U_{OUT}-U_{N2}$ is increased and, in an optimum case, maximized. As has already been mentioned, an increase in the $U_{DIFF}$ during the phases with a low $U_{OUT}$ leads to an overall lower degree of modulation of $U_{DIFF}$ and thus to a lower lamp current crest factor.

The invention claimed is:

1. A circuit arrangement for operating at least one light source comprising:
   a rectifier (D7, D8, D9, D10) having a system voltage input (J1, J2) which provides a rectified system AC voltage at a positive (POS) and a negative rectifier output (NEG) when a system AC voltage having a system frequency is applied to its system voltage input;
   a first diode (D1) which is coupled with its anode to the positive rectifier output (POS) and with its cathode to a positive rail (DCP);
   a negative rail (DCN) which is coupled to the negative rectifier output (NEG);
   a second (D3), a third (D4), a fourth (D5) and a fifth diode (D6) which are connected in series between the positive (DCP) and the negative rail (DCN), in each case the cathode of these diodes (D3, D4, D5, D6) pointing towards the positive rail (DCP), and the junction points of these diodes (D3, D4, D5, D6) forming the following nodes: a first node (N1) between the second (D3) and the third diode (D4), a second node (N2) between the third (D4) and the fourth diode (D5), and a third node (N3) between the fourth (D5) and the fifth diode (D6);
   a first (C1) and a second storage capacitor (C2), the first storage capacitor (C1) being connected between the positive rail (DCP) and the first node (N1), and the second storage capacitor (C2) being connected between the negative rail (DCN) and the third node (N3);
   an inverter (T1, T2) which is connected to the positive (DCP) and the negative rail (DCN) for power supply purposes and provides an inverter output voltage ($U_{OUT}$), which has an inverter oscillating frequency which is substantially higher than the system frequency, at an inverter output (OUT) opposite the negative rail (DCN);
   a reactance network which is connected to the inverter output (OUT) and provides output terminals (J3, J4) for the purpose of connecting the at least one light source, the reactance network comprising a lamp inductor (L1) which has a first and a second connection, and the first connection being coupled to the inverter output (OUT);
   a pump capacitor (C3) which is coupled between the second node (N2) and the positive rectifier output (POS),
   a coupling between the reactance network and the second node (N2) which brings about a voltage waveform, which has the inverter oscillating frequency, at the second node (N2) opposite the negative rail (DCN),
   characterized
   in that a phase-shifting device (L2) is connected into the coupling between the reactance network and the second node, the phase-shifting device (L2) being designed to bring about a lead of more than 90° or a lag of the phase between the coupling point in the reactance network and the second node (N2).

2. The circuit arrangement as claimed in claim 1, characterized
   in that the phase-shifting device (L2) is connected between the inverter output (OUT) and the second node (N2).

3. The circuit arrangement as claimed in claim 1, characterized
   in that the circuit arrangement has a second pump capacitor (C4) and a sixth diode (D2), the second pump capacitor (C4) being connected to the second node (N2) and the negative rectifier output (NEG), and the sixth diode (D2) being connected between the negative rectifier output (NEG) and the negative rail (DCN).

4. The circuit arrangement as claimed in claim 1, characterized
   in that the positive (DCP) and the negative rail (DCN) are connected to one another via a capacitor (C5).

5. The circuit arrangement as claimed in claim 1, characterized
   in that the phase-shifting device (L2) is designed to maximize the voltage difference ($U_{DIFF}$) between the voltage at the inverter output ($U_{OUT}$) and the voltage ($U_{N2}$) at the second node (N2) in the region of minima of the system voltage.

6. The circuit arrangement as claimed in claim 1, characterized
   in that the light source ($L_p$) is a gas discharge lamp having heatable filaments, in each case one connection of a filament being connected to an output terminal (J3, J4) of the reactance network and the respective other connections (J5, J6) of the filaments being connected via a capacitor when the gas discharge lamp ($L_p$) is connected.

7. The circuit arrangement as claimed in claim 1, characterized
   in that the phase-shifting device comprises at least one active component.

8. The circuit arrangement as claimed in claim 1, characterized
   in that the phase-shifting device comprises an inductor (L2).

9. The circuit arrangement as claimed in claim 8, characterized
   in that the phase-shifting device (L2) is connected between the inverter output (OUT) and the second node (N2).

10. The circuit arrangement as claimed in claim 1, characterized
in that the reactance network has a first resonant capacitor (C52) which is connected with its first connection to the positive (DCP) or the negative rail (DCN) and is connected with its second connection to the second connection of the lamp inductor (L1).

11. The circuit arrangement as claimed in claim 10, characterized in that the reactance network has a second resonant capacitor (C51) which is connected with its first connection to the coupling between the reactance network and the second node (N2) and is connected with its second connection to the second connection of the lamp inductor (L1).

* * * * *